(12) United States Patent
Hoare et al.

(10) Patent No.: US 9,149,065 B2
(45) Date of Patent: Oct. 6, 2015

(54) COMBINATION JUICER-BLENDER

(75) Inventors: Richard Hoare, Lane Cove (AU);
Richard Harrod, Erskineville (AU);
Khon Thai, Beverly Hills (AU);
Michael Wong, Botany (AU)

(73) Assignee: Breville Pty Limited, Alexandria, New South Wales (AU)

( * ) Notice: Subject to any disclaimer, the term of this patent is extended or adjusted under 35 U.S.C. 154(b) by 296 days.

(21) Appl. No.: 13/634,862

(22) PCT Filed: Mar. 9, 2011

(86) PCT No.: PCT/AU2011/000264
§ 371 (c)(1),
(2), (4) Date: Oct. 30, 2012

(87) PCT Pub. No.: WO2011/113083
PCT Pub. Date: Sep. 22, 2011

(65) Prior Publication Data
US 2013/0192477 A1     Aug. 1, 2013

(30) Foreign Application Priority Data

Mar. 18, 2010  (AU) ................. 2010901126

(51) Int. Cl.
| A23N 1/02 | (2006.01) |
| A23N 1/00 | (2006.01) |
| A47J 36/32 | (2006.01) |
| A47J 43/06 | (2006.01) |
| A47J 43/07 | (2006.01) |
| B01F 7/16 | (2006.01) |
| A47J 19/02 | (2006.01) |

(52) U.S. Cl.
CPC ......... *A23N 1/02* (2013.01); *A23N 1/003* (2013.01); *A47J 36/32* (2013.01); *A47J 43/06* (2013.01); *A47J 43/0716* (2013.01); *A47J 43/0727* (2013.01); *B01F 7/162* (2013.01); *A47J 19/027* (2013.01)

(58) Field of Classification Search
CPC ......... A47J 19/027; A23N 1/003; A23N 1/00; A23N 1/02
USPC ............ 99/510, 511, 513, 337; 366/206, 601; 241/92, 37.5
See application file for complete search history.

(56) References Cited

U.S. PATENT DOCUMENTS

| 4,716,823 | A | * | 1/1988 | Capdevila | 99/510 |
| 5,071,077 | A | * | 12/1991 | Arroubi et al. | 241/36 |
| 5,852,968 | A | * | 12/1998 | Sundquist | 99/492 |
| 6,112,649 | A | * | 9/2000 | Jeong | 99/492 |
| 6,715,706 | B1 | * | 4/2004 | Planca et al. | 241/36 |
| 8,042,990 | B2 | * | 10/2011 | Pryor et al. | 366/197 |

* cited by examiner

*Primary Examiner* — Reginald L Alexander
(74) *Attorney, Agent, or Firm* — Molins & Co Pty Ltd

(57) ABSTRACT

An motorized base apparatus for selectively receiving an appliance. The apparatus comprising: a control interface; an appliance coupling element; an appliance sensor element; an appliance retaining mechanism; and a processor element. The processor element being coupled to the appliance sensor element for receiving data indicative of the selectively received appliance. The processor element being coupled to the control interface for adapting the interface in response to the identified appliance.

18 Claims, 9 Drawing Sheets

COMBINATION JUICER-BLENDER

FIELD OF THE INVENTION

The invention pertains to kitchen appliances and more particularly to electrical kitchen appliances.

The invention has been developed primarily for use as a combination juicer and blender and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Fruit and vegetable juicers are well known. Blenders are also well known. Both appliances utilise an electric motor to spin a working part. The present invention seeks to integrate the aforesaid appliances by providing a single motorised base that can accept a specially configured juicer head or blender head interchangeable, safely and economically. It will be appreciated that the motorised base and sensor arrangement taught in the present invention may be used to drive kitchen appliances other than a juicer or blender.

OBJECTS OF THE INVENTION

It is an object of the present invention to overcome or ameliorate at least one of the disadvantages of the prior art, or to provide a useful alternative.

It is an object of the invention in a preferred form to provide a motorised based that accepts both a juicing head a blending head.

It is another object of the invention in a preferred form to provide a motorised base that can selectively detect the presence of either juicing head or a blending head and having means for altering the configuration of a control on the base according to what is detected.

SUMMARY OF THE INVENTION

According to the invention there is provided an apparatus for providing a motorised base to a selectively received appliance, the apparatus comprising:
  a control interface;
  an appliance coupling element;
  an appliance sensor element;
  an appliance retaining mechanism; and
  a processor element coupled to the appliance sensor element for receiving data indicative of the selectively received appliance; the processor element being coupled to the control interface for adapting the interface in response to the identified appliance.

Preferably, the control interface is adaptively configurable for enabling tailored control to the selectively received appliance.

Preferably, the processor element is adapted to identify the appliance and present a predetermined respective control interface. More preferably, the processor element is adapted to receive control data from the control interface and respectively control the appliance coupling element.

Preferably, the coupling element is a dual function coupling element.

Preferably, the retaining mechanism includes a locking bar. More preferably, the locking bar is rotatable to engage one or more retention detents on an exterior surface of the appliance.

Preferably, the apparatus includes a safety mechanism that cooperates with the retaining mechanism for preventing operation unless the retaining mechanism is substantially full engaged with the appliance. More preferably, the processor element is coupled to the safety mechanism for restricting operation of the appliance coupling element when the retaining mechanism is not substantially full engaged with the appliance.

Preferably, the processor element is further adapted to present a restricted control interface when the retaining mechanism is not substantially full engaged with the appliance.

Preferably, wherein the appliance includes a magnetic element located proximal to a lower surface. More preferably, the appliance further includes a hall effect sensor for detecting presence of the magnetic element, thereby identifying orientation of the appliance. Most preferably, the processor element is coupled to the hall effect sensor, and upon receipt of data indicative of the orientation of the appliance, the processor being adapted to respectively alter the control interface.

Preferably, an upper surface of the apparatus comprises a contoured surface that includes one or more locating depressions for receiving cooperating features of the appliance. More preferably, cooperation of the depressions with the appliance, restrict the appliance into a single operative orientation in which it is seated against the apparatus.

Preferably, the coupling element is adapted to receive a male coupling component from the appliance. More preferably, the coupling element includes internal splines for cooperatively engaging external splines formed on a male coupling of the appliance. The coupling element preferably includes spaced apart longitudinal grooves for cooperating with features on a female coupling component of the appliance. The coupling element preferably includes retractable protrusions, which are biased radically outward for seating the appliance coupling and providing a tactile feed-back.

Preferably, the apparatus includes an electric motor for driving the coupling element. More preferably, the apparatus is a motorised based for selectively receiving either a juicing head appliance or a blending head appliance.

According to a further aspect of the invention there is provided a computer program product stored on a computer usable medium, the computer program product adapted to provide a control interface for a processor element, the processor element being adapted to receive configuration data indicative of an appliance and present a predetermined respective control interface.

BRIEF DESCRIPTION OF THE DRAWING FIGURES

In order that the invention be better understood, reference is now made to the following drawing figures in which.

BEST MODE AND OTHER EMBODIMENTS OF THE INVENTION

Figure 1:
FIG. 1 is a perspective view illustrating a motorised base, juicing head and blending head.

As shown in FIG. 1, a combination juicer and blender 10 comprises a motorised base 11, a juicing head 12 and a blending head 13. The motorised base is seen as having a safety bar or locking bar 14, a multi function user operated controller 15 and a dual function coupling 16.

Figure 2:
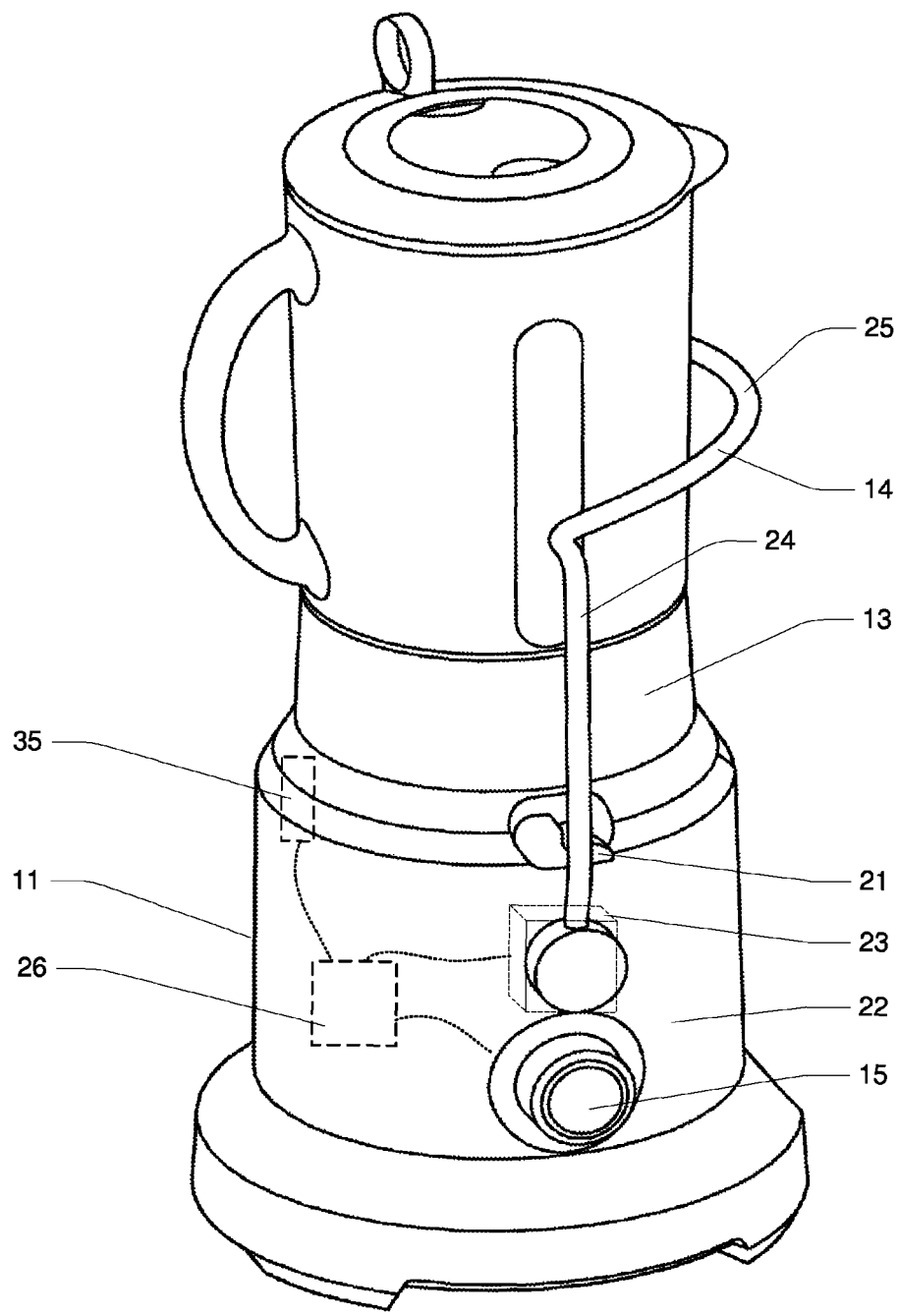
FIG. 2 is a perspective view of the base and blender head, assembled.

As shown in FIG. 2, the blending head 13 may be assembled on to the top of the motorised base 11. By comparison to FIG. 1, it can be seen that the safety bar 14 has been rotated into a fully upright orientation. In the upright orientation, the safety bar is received and retained by one or more retention detents 21 that protrude from an exterior surface from the blender head. Within the cylindrical body 22 of the motorised base 11 there is an electrical cut-out or safety mechanism 23 that prevents the motor from operating unless the safety bar 14 is in the fully upright orientation. Note that in this example, the safety bar 14 comprises a pair of metallic uprights 24 that are interconnected by a generally semi-circular bail 25. The orientation of the safety bar 14 is sensed by a mechanism 23 internal to the base that cooperates with a processor or switching arrangement 26. The processor or switching arrangement 26 also cooperates with a user operated control 15.

The detent 21 on the blender has vertical features that receive a small horizontal stub 72 that extends radially inward from a lower portion of the locking bar. The vertical features of the detent 21 on the blending head mimic the vertical features on the juicing head's cap 48, 49.

Figure 3:
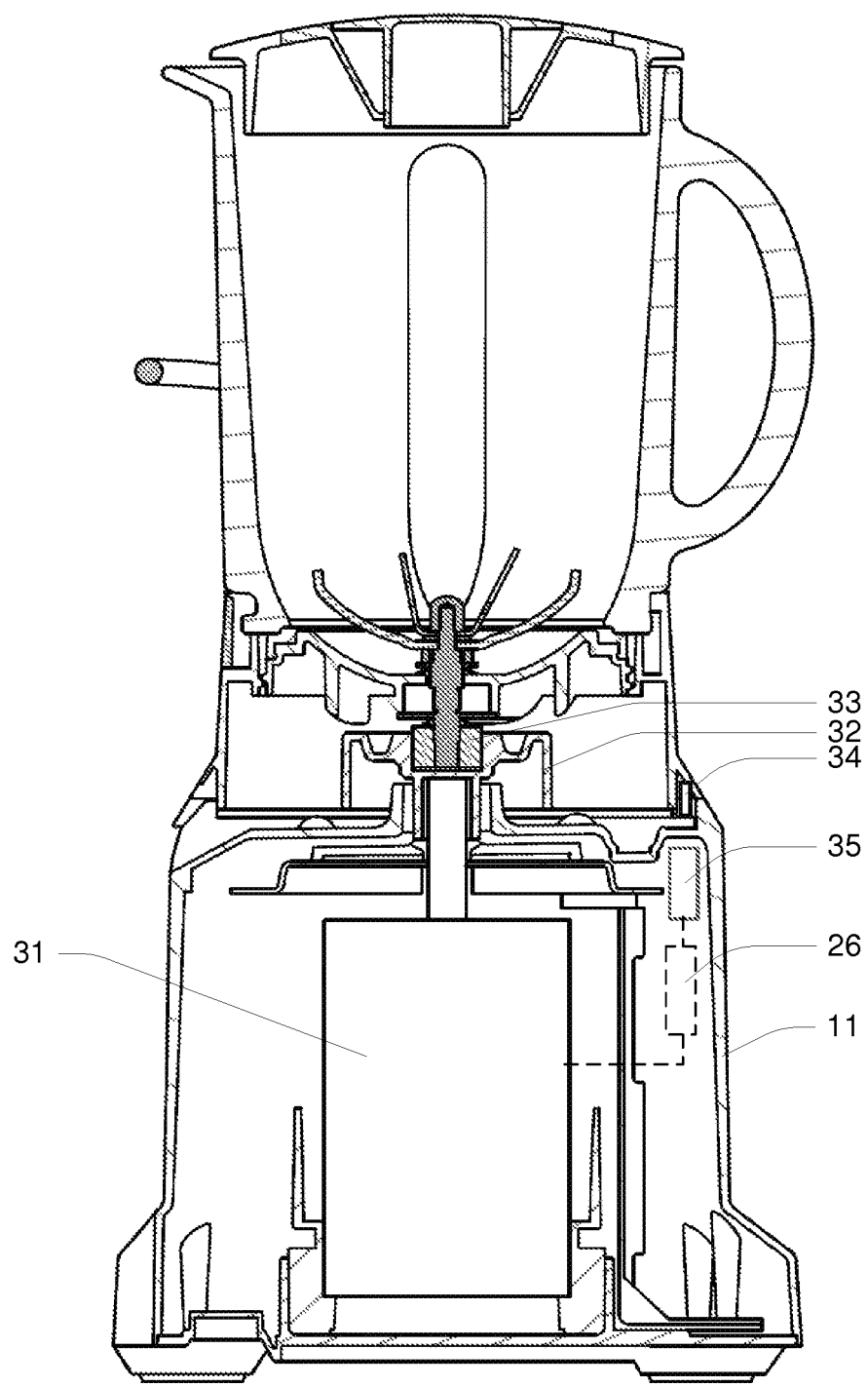
FIG. 3 is a cross section of the device depicted in FIG. 2.

As shown in FIG. 3, the base 11 contains a vertically oriented or upright electric motor 31 that drives an external coupling 32. The coupling 32 is adapted to receive a pinion like stub shaft or male coupling component 33 that protrudes from the bottom surface of the blender head. A magnet 34 is located directly or nearly adjacent to a lower surface of the blender head. Because of the mechanical cooperation between the blender head and the motorised base 11, the blender head may only be oriented one way with respect to the base 11. In this correct or "seated" orientation, the presence of the magnet 34 can be detected by a Hall effect sensor 35 that cooperates with the processor 26. A recognition signal sent by the Hall sensor 35 causes the processor 26 to alter the way that the user control of the base's motor 31 operates, that is, from a first or juicer mode to a second or blender mode.

Figure 4:
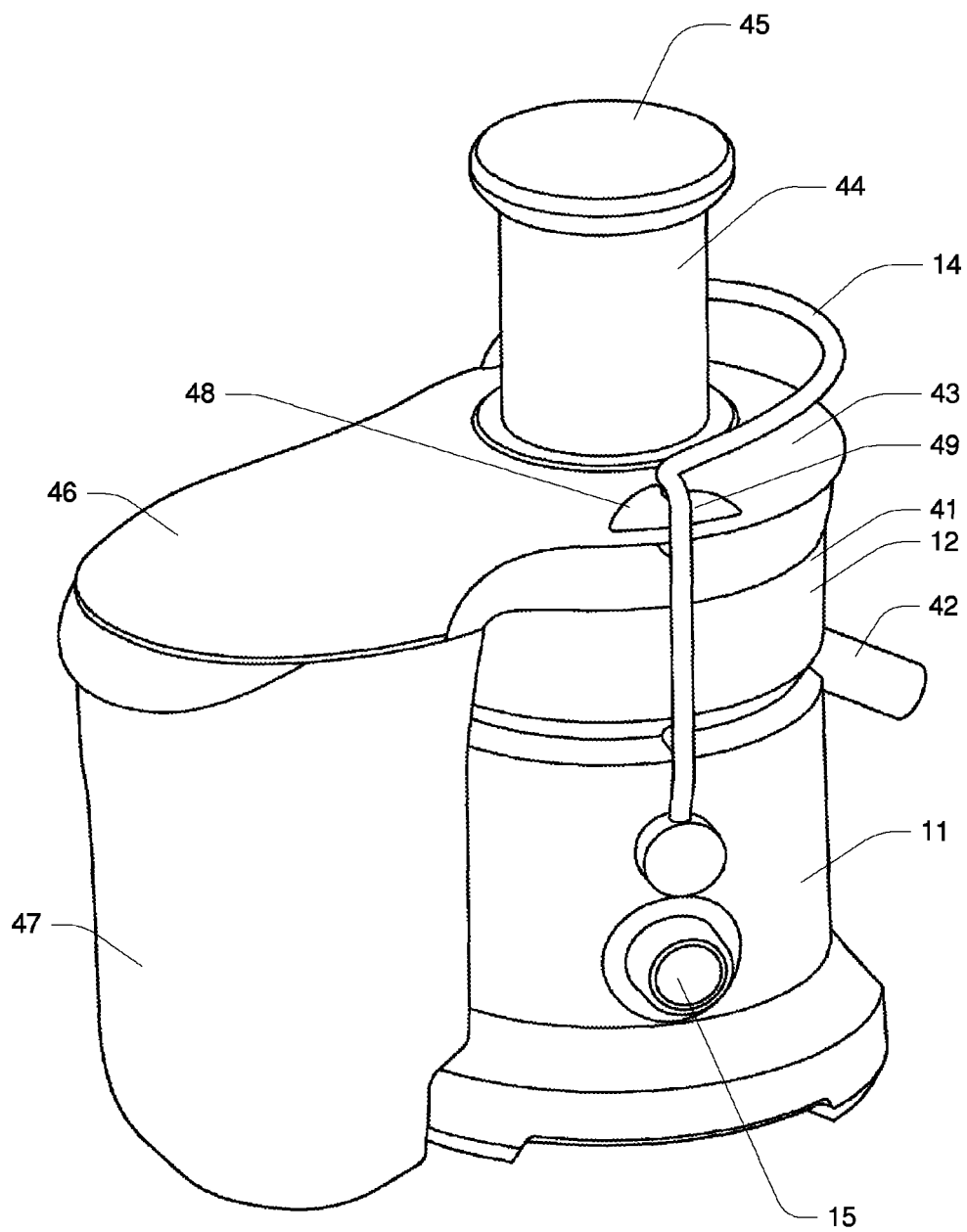
FIG. 4 is a perspective view of a motorised base and juicing head.

As shown in FIG. 4, the motorised base will also accept a juicing head 12. The juicing head lacks a magnetic trigger or target for the Hall sensor 35 and therefore, the processor will operate in the aforementioned first mode when the juicing head 12 is in place. The juicing head 12 comprises a juice collector vessel 41 having a spout 42. The juicer collecting vessel is covered by a cap or lid 43 having a feed tube 44. In preferred embodiments, the cap or lid is transparent or "see through" and the feed tube is fabricated from stainless steel and affixed to the cap. The feed tube 44 receives a pusher 45. The lid or cap 43 has an extension 46 that assists in the diversion of unwanted pulp into a removable pulp collector 47. In preferred embodiments, the pulp collector has a surface that conforms to the rounded external shape of the base 11. The upper surface of the cap further comprises a detent 40 with a ramped surface 49. The detent is able to receive and temporarily secure the safety bar 14. The motor will only operate when the safety bar 14 is in a fully upright orientation.

Figure 5:
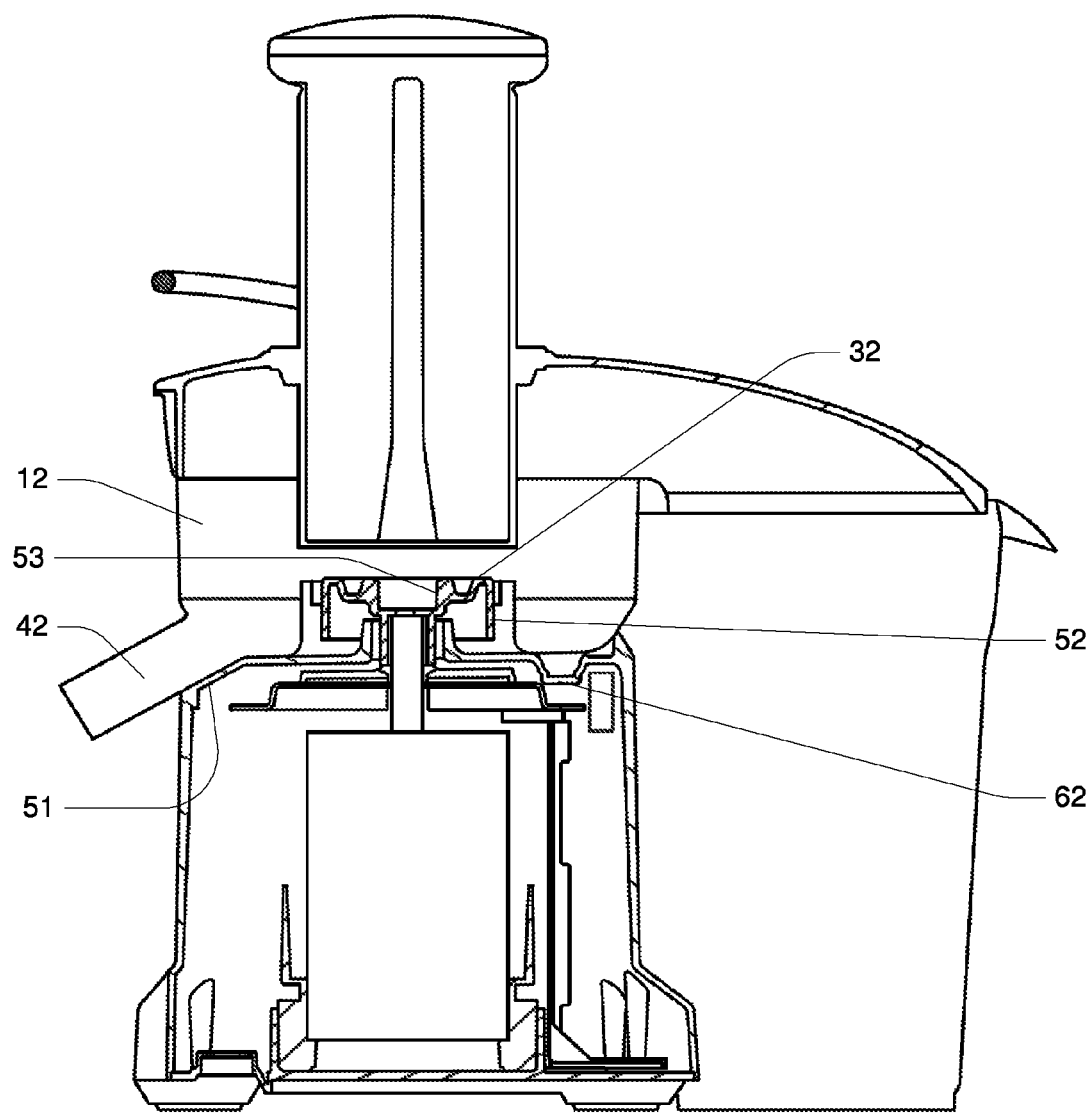
FIG. 5 is a cross section of the device depicted in FIG. 4.

As shown in FIG. 5, the upper surface of the base contains a notch or grove 51 for receiving the spout 42 of the juicing head 12. It will also be appreciated that the rotating grating disk and filter basket will engage the outside diameter 52 of the base's coupling 32. Thus, the central void 53 of the coupling is used, in this example, only for the blender's corresponding male coupling part and is not used with the juicing head. Similarly, when the blender head is engaged with the central recess 53, the rim oriented features that used to drive the juicer's grating disk and filter basket are not used (see FIG. 6).

As shown in FIG. 5, an upper surface 61 of the motorised base 11 comprises a contoured surface that includes one or more locating depressions 62 for receiving cooperating features of the blender head. The cooperation of the depressions 62 and the blender head features force the blender head into a single orientation in which the blender head can be properly seated against the base. A small depression 63 may be located above the Hall sensor 35 on the upper surface of the base 11. The various orientation depressions 62 may also be used to orient and secure the juicing head.

Figure 6:
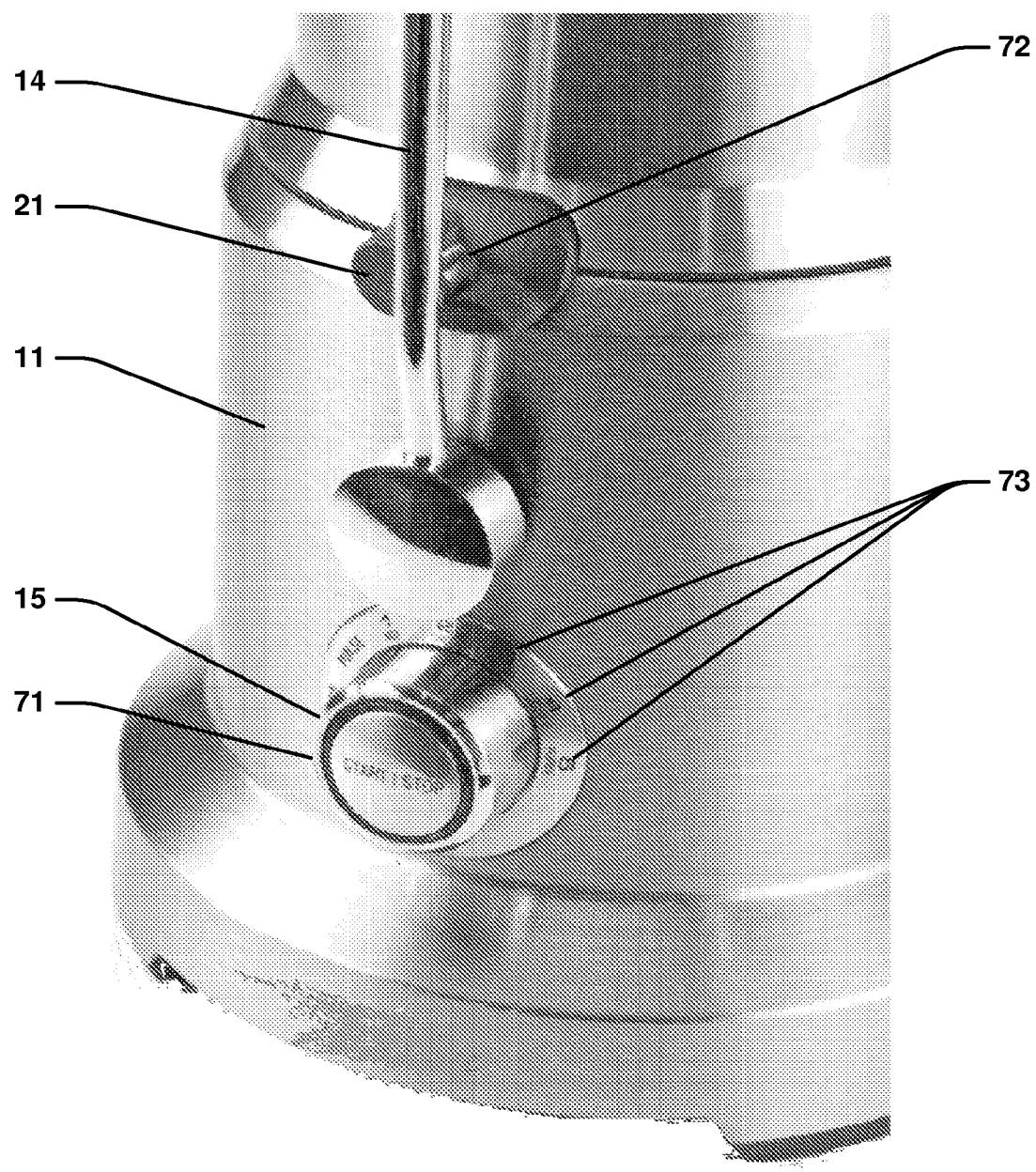
FIG. 6 is a perspective view of a combination coupling.

FIG. 6 clearly illustrates the rotating coupling 32. The central recess 53 is seen as having internal teeth or splines etc 64 for engaging or cooperating with the external teeth or splines formed on the blender's male coupling counterpart 33. This same coupling 32 also has spaced apart longitudinal grooves 65 for cooperating with features on the female coupling component of the juicing head. Retractable steel ball bearings, biased radially outward with compression springs may be used to firmly seat the juicing head's coupling and provide tactile feed-back.

Figure 7:
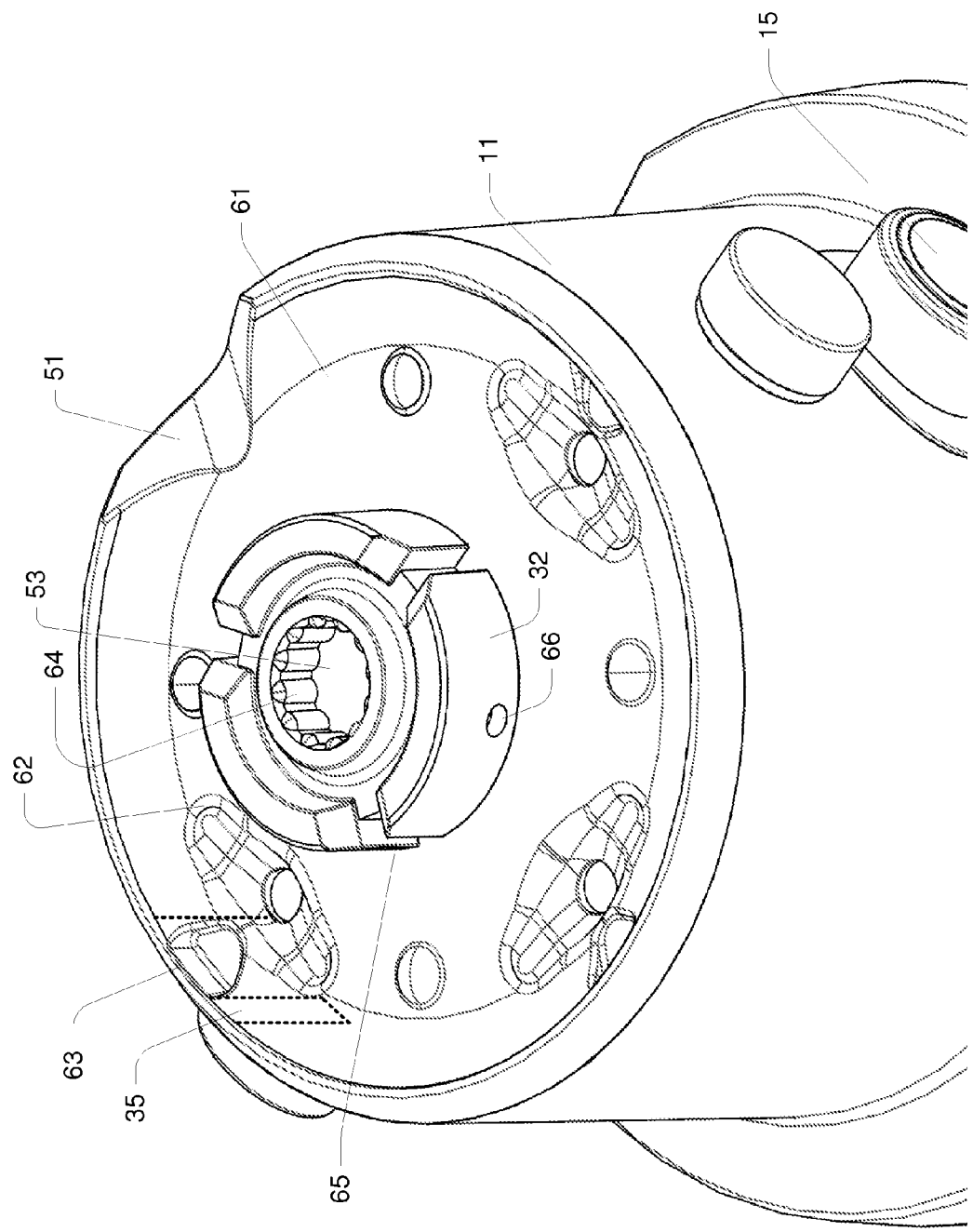
FIG. 7 is a perspective view of a multi-function user operated control.

As shown in FIG. 7, the motorised base 11 features a user operated control 15 on an exterior location. In this example, the control 15 comprises a rotary knob or dial 71 that also operates as a push switch. Rotation of the knob 71 corresponds generally to motor speed for the first mode or juicing mode but also acts as a blender program selector when in the second mode. It will be appreciated that the control over the motor including motor speed and various motor programs are achieved by having microprocessor control over the motor or its speed controller. It will also be appreciated that one of the benefits of the invention is being able to utilised the same user control in different ways, depending upon which appliance head is located on the base. In this example, a rotating knob that also acts as a push button is provided. In other embodiments, different forms of user control may be provided without departing from the scope of the invention. In more sophisticated embodiments a touch screen may be provided. In this way, the display and interactive capability of the touch screen may be determined by the above method, i.e. determined according to detection (or not) of a particular appliance head. This may be done with a magnet and a Hall sensor or by other means as are commonly known in the art. The determination of which appliance head is present may also be accomplished in a variety of ways, that is, by using micro switches, optical sensors or RFID.

In the first or juicing mode, the rotational position of the knob 71 merely acts to increase the motor speed, continuously, within a range indicated by visible numerals "1-5" 73. When the blender head 13 is properly oriented and the safety bar 14 is fully vertical, and the blender head's magnet 34 is detected by the Hall sensor 35, the processor utilises the outputs from the user control 15 in a different way. The second mode or blender mode controls (indicated by the rotating knob 71) comprise well known blender functions such as the "smoothie", "ice crushing", "pulse" and normal continuous operation. For example, when the user selects "smoothie" functionality using the knob 15, the blender will operate in accordance with the following processor program. The motor will cycle automatically between high and low speeds for predetermined intervals over a set time of approximately one minute. The alternation between high motor speed and slower motor speed optimises both the liquification of the ingredients within the blender as well as agitating the entire contents of the blender to achieve uniform mixing and breakdown of the blender contents.

Both the juicing head and the blender head have only one correct orientation with respect to the motorised base. This is to ensure that the locking bar or safety bar 14 can be utilised for both heads.

Figure 8:
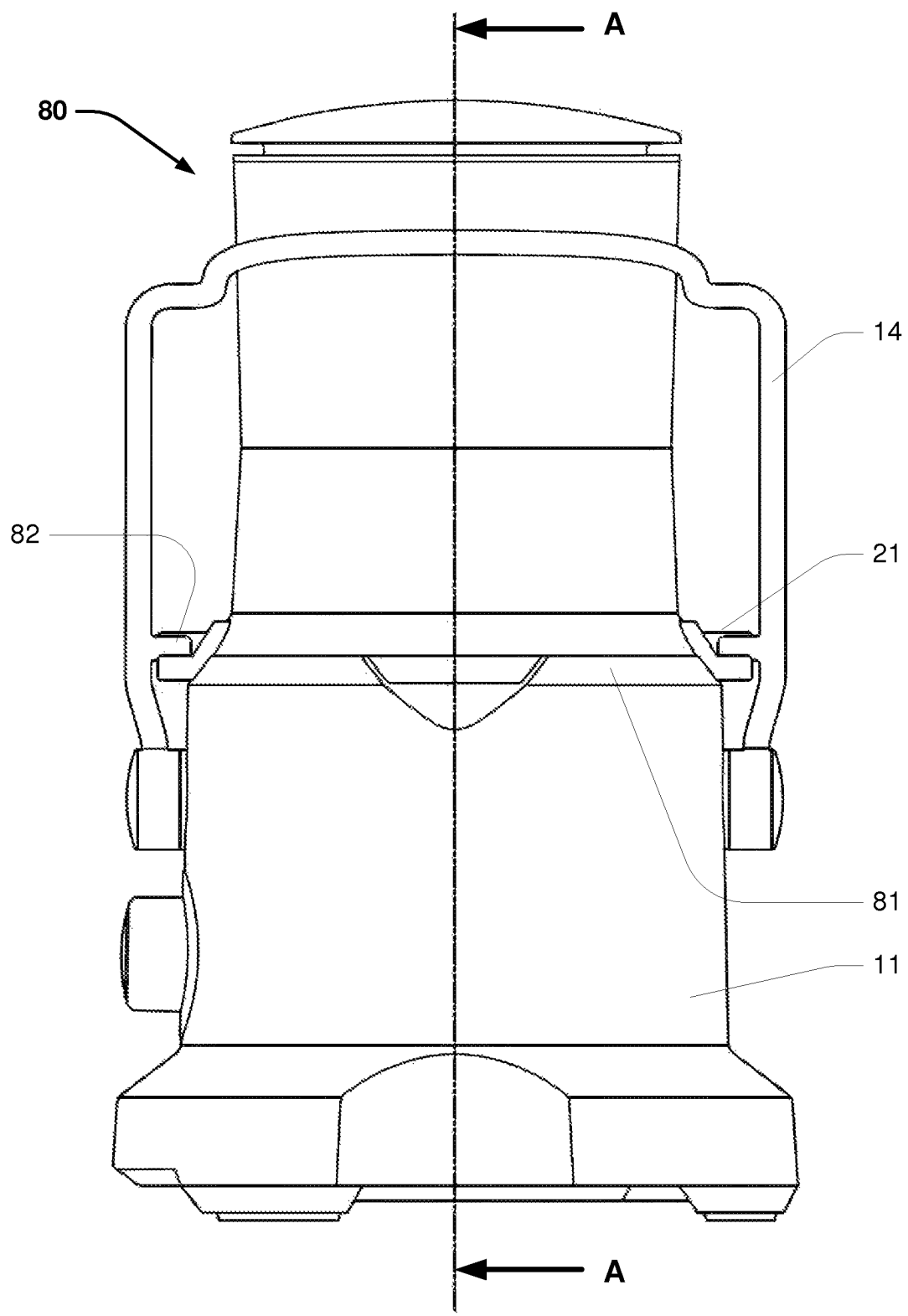
FIG. 8 is a side elevation of a motorised base being used in conjunction with another appliance head.
Figure 9:
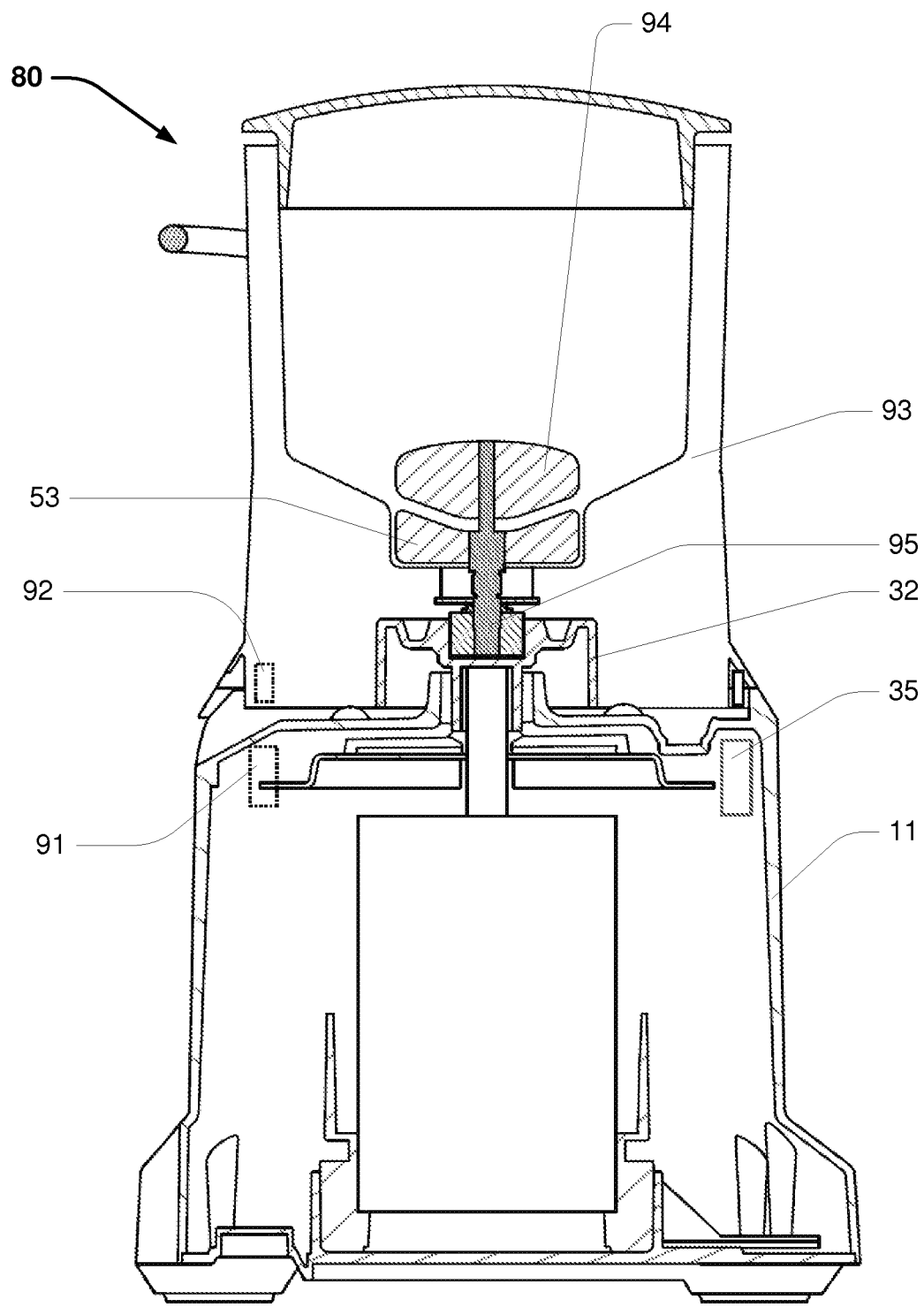
FIG. 9 is a cross section through line A-A of FIG. 8.

As suggested by the above description, the motorised base of the present invention is adapted to be used in conjunction with other types of appliance heads. A variety of different appliance heads can be used so long as the appliance can be driven by the aforementioned external coupling 32, be mountable on the base 11, and interact with the safety bar 14 and sensor 35. To illustrate this point, a "generic" appliance head 80 is depicted as being mounted upon the base 11 in FIG. 8 and FIG. 9. In this example the head 80 is seen as having retention detents 21 located at the lower extremity 81 of the head similar to those disclosed with reference to the blender in FIG. 2. The ramped detents 21 receive inward facing projections 82 of the safety bar 14 and thus prevent operation of the motor unless the safety bar is in the fully upright orientation. As suggested by FIG. 8, the head 80 must fit within the confines of the safety bar when it is in the upright orientation. As shown in FIG. 9, the motorised base 11 may be provided with two sensors (such as hall sensors) 35, 91. The second sensor 91 is also located internally of the base 11 and interacts with a magnet or other target 92 located within the body 93 of the appliance head 80. The interaction between the magnet 92 and the second hall sensor 91 causes a third type of graphic display to be generated. The appliance head 80 is depicted as having a working part 94 such as a chopper or grinding head arrangement that presents an external male coupling element 95. In this example, the appliance head's coupling element 95 is received within the central recess 53 of the base's coupling 32. Extrapolating from the above description it will be appreciated that practically any number of appliance heads may be provided for use in conjunction with a motorised base 11 in accordance with the teachings provided in the above specification.

It will be appreciated that disclosed embodiments can provide a motorised based that accepts both a juicing head a blending head. It will be further appreciated that disclosed embodiments can provide a motorised base that can selectively detect the presence of either juicing head or a blending head alters the configuration of a control on the base according to what is detected.

While the present invention has been disclosed with reference to certain details of construction, these should be understood as having been provided by way of example and not as limitations to the scope or spirit of the invention.

Although the invention has been described with reference to specific examples, it will be appreciated by those skilled in the art that the invention may be embodied in many other forms.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The claims defining the invention are as follows:

1. An apparatus for providing a motorised base to a selectively received appliance, the apparatus comprising:
   a control interface;
   an appliance coupling element;
   an appliance sensor element;
   an appliance retaining mechanism; and
   a processor element coupled to the appliance sensor element for receiving data indicative of the selectively received appliance; the processor element being coupled to the control interface for adapting the interface in response to the identified appliance;
   wherein the apparatus is a motorised base for selectively receiving either a juicing head appliance or a blending head appliance; and
   wherein the appliance retaining mechanism includes a locking bar, wherein the locking bar is rotatable to engage one or more retention detents on an exterior surface of each the juicing head appliance and the blending head appliance when selectively received by the apparatus;
   wherein the one or more retention detents protrude from each of the juicing head appliance and the blending head appliance; the detent has a feature that receives a small horizontal portion of the locking bar; and
   wherein each retention detent has a ramped surface for engaging the horizontal portion of the locking bar, the detent receiving and temporarily securing the locking bar.

2. The apparatus according to claim 1, wherein the control interface comprises a rotary selector; and in that upon detection of a juicing head appliance rotation of the selector corresponds generally to motor speed and upon detection of a blending head appliance rotation of the rotary selector acts as a blender program selector.

3. The apparatus according to claim 2, wherein the processor element is adapted to receive control data from the control interface and respectively control the appliance coupling element.

4. The apparatus according to claim 3, wherein the coupling element is a dual function coupling element.

5. The apparatus according to claim 1, wherein the apparatus includes a safety mechanism that cooperates with the retaining mechanism for preventing operation unless the retaining mechanism is substantially full engaged with the appliance.

6. The apparatus according to claim 5, wherein the processor element is coupled to the safety mechanism for restricting operation of the appliance coupling element when the retaining mechanism is not substantially full engaged with the appliance.

7. The apparatus according to claim 6, wherein the processor element is further adapted to present a restricted control interface when the retaining mechanism is not substantially full engaged with the appliance.

8. The apparatus according to claim 3, wherein the appliance includes a magnetic element located proximal to a lower surface, and the appliance further includes a hall effect sensor for detecting presence of the magnetic element, thereby identifying orientation of the appliance.

9. The apparatus according to claim 8, wherein the processor element is coupled to the hall effect sensor, and upon receipt of data indicative of the orientation of the appliance, the processor being adapted to respectively alter the control interface.

10. The apparatus according to claim 3, wherein an upper surface of the apparatus comprises a contoured surface that includes one or more locating depressions for receiving cooperating features of the appliance.

11. The apparatus according to claim 10, wherein cooperation of the depressions with the appliance, restrict the appliance into a single operative orientation in which it is seated against the apparatus.

12. The apparatus according to claim 11, wherein the coupling element is adapted to receive a male coupling component from the appliance.

13. The apparatus according to claim 12, wherein the coupling element includes internal splines for cooperatively engaging external splines formed on a male coupling of the appliance.

14. The apparatus according to claim 11, wherein the coupling element includes spaced apart longitudinal grooves for cooperating with features on a female coupling component of the appliance.

15. The apparatus according to claim 14, wherein the coupling element includes retractable protrusions, which are biased radically outward for seating the appliance coupling and providing a tactile feed-back.

16. The apparatus according to claim 15, wherein the apparatus includes an electric motor for driving the coupling element.

17. The apparatus according to claim 3, wherein the processor element is adapted to identify the appliance and present a predetermined respective control interface.

18. The apparatus according to claim 1, wherein a detent on the juicer head appliance has a ramped surface for received a horizontal upper portion of the locking bar; wherein a detent on the blender head appliance has a ramped surface for receiving a small horizontal stub that extends inward from a lower portion of the locking bar; each detent receiving and temporarily securing the locking bar.

* * * * *